(12) United States Patent
Schwelling

(10) Patent No.: US 11,181,145 B2
(45) Date of Patent: Nov. 23, 2021

(54) BEARING ARRANGEMENT AND THUS EQUIPPED PROCESSING DEVICE

(71) Applicant: Hermann Schwelling, Salem (DE)

(72) Inventor: Hermann Schwelling, Salem (DE)

( * ) Notice: Subject to any disclaimer, the term of this patent is extended or adjusted under 35 U.S.C. 154(b) by 554 days.

(21) Appl. No.: 16/037,614

(22) Filed: Jul. 17, 2018

(65) Prior Publication Data

US 2019/0048929 A1 Feb. 14, 2019

(30) Foreign Application Priority Data

Aug. 9, 2017 (DE) .......................... 102017118068.0
Apr. 9, 2018 (DE) .......................... 102018108300.9

(51) Int. Cl.
*F16C 19/54* (2006.01)
*F16C 41/00* (2006.01)
(Continued)

(52) U.S. Cl.
CPC .......... *F16C 19/548* (2013.01); *B02C 18/142* (2013.01); *B02C 18/16* (2013.01); *B02C 19/0081* (2013.01); *B30B 3/005* (2013.01); *B30B 3/04* (2013.01); *B30B 9/325* (2013.01); *F16C 19/54* (2013.01); *F16C 33/76* (2013.01);
(Continued)

(58) Field of Classification Search
CPC ........... B30B 9/20; B30B 9/202; B30B 9/325; B30B 3/00; B30B 3/005; B30B 3/04; B30B 3/045; F16C 33/80; F16C 2320/23; F16C 19/548; F16C 19/54; F16C 33/76; F16C 41/00; F16C 2322/00; B02C 4/283;
(Continued)

(56) References Cited

U.S. PATENT DOCUMENTS 2,793,583 A * 5/1957 Messing ................. B30B 9/202
100/45
3,860,180 A 1/1975 Goldhammer
(Continued)

FOREIGN PATENT DOCUMENTS

AT 401893 5/1996
DE 2450936 4/1975
(Continued)

OTHER PUBLICATIONS

Translation: Hoppe, DE-102012009590-B3, Translated Jan. 7, 2021 (Year: 2013).*
(Continued)

*Primary Examiner* — Jimmy T Nguyen
(74) *Attorney, Agent, or Firm* — Head, Johnson, Kachigian & Wilkinson, PC

(57) ABSTRACT

In order for contaminants (50) that are in particular liquid or highly viscous or solid and impact in an operating portion (40b) of one or 2 processing shafts (40.1, 40.2) that rotate adjacent to each other not to reach bearings (2) of the shafts (40.1, 40.2) which are arranged axially outside of the processing portion (40b) which could damage the bearings a wiping device (6) is arranged there between which is additionally axially shielded by a bearing plate (3) and a (Continued)

splash guard plate (4) wherein the wiping device provides that contaminants (50) that reach the wiping section (40*a*) are wiped off at this location and cannot move further through the bearing plate (3) to the bearing (2) that is arranged outside of the bearing plate (3).

18 Claims, 14 Drawing Sheets

(51) Int. Cl.
| | | |
|---|---|---|
| *B30B 3/04* | (2006.01) | |
| *B30B 9/32* | (2006.01) | |
| *B02C 18/16* | (2006.01) | |
| *F16C 33/76* | (2006.01) | |
| *B02C 19/00* | (2006.01) | |
| *B02C 18/14* | (2006.01) | |
| *B30B 3/00* | (2006.01) | |
| *F16C 33/80* | (2006.01) | |

(52) U.S. Cl.
CPC .............. *F16C 41/00* (2013.01); *F16C 33/80* (2013.01); *F16C 2320/23* (2013.01); *F16C 2322/00* (2013.01)

(58) Field of Classification Search
CPC ......... B02C 4/40; B02C 18/142; B02C 18/16; B02C 19/0081
USPC .................................................. 100/349, 352
See application file for complete search history.

(56) References Cited

U.S. PATENT DOCUMENTS

| | | | | |
|---|---|---|---|---|
| 3,991,944 | A | * | 11/1976 | Baikoff ................. B02C 18/184 |
| | | | | 241/36 |
| 5,188,214 | A | * | 2/1993 | Uttke ..................... B65G 39/09 |
| | | | | 198/501 |
| 6,098,390 | A | * | 8/2000 | Anstey ................... A01F 15/07 |
| | | | | 198/497 |
| 10,071,533 | B2 | * | 9/2018 | Jenter ....................... G07F 9/10 |

FOREIGN PATENT DOCUMENTS

| | | | | |
|---|---|---|---|---|
| DE | 4344844 | | 8/1995 | |
| DE | 10247281 | | 3/2004 | |
| DE | 102007040046 | | 2/2009 | |
| DE | 202009013547 | | 6/2010 | |
| DE | 102012009590 | B3 * | 8/2013 | ............. B30B 9/325 |
| DE | 102014010609 | | 1/2016 | |
| DE | 102014010609 | A1 * | 1/2016 | ............. B30B 9/325 |
| EP | 3098068 | | 11/2016 | |
| GB | 548051 | | 9/1942 | |

OTHER PUBLICATIONS

Translation: Schwelling, DE 1020140609 A1, Translated Dec. 14, 2020 (Year: 2016).*

* cited by examiner

BEARING ARRANGEMENT AND THUS EQUIPPED PROCESSING DEVICE

I. FIELD OF THE INVENTION

The invention relates to a bearing arrangement for a shaft that is rotatably supported and includes a wiping device for contaminants arranged at the shaft.

II. BACKGROUND OF THE INVENTION

In a plurality of processing devices which include at least one rotating processing shaft for processing objects and where contaminants at the shaft can occur during processing, there is a problem in securing the bearing of the shaft against a penetration of contaminants. Typically a seal at the bearing is used to solve the problem.

However, when the contaminants either include highly abrasive solids and/or high viscosity liquids, it is difficult to provide a seal which reliably prevents the penetration of liquids as well as of solids.

When contaminants get into the bearing, they can destroy the bearing very quickly, in particular when the liquids can transform into a hard and abrasive solid material quickly.

A typical processing device of this type is a machine which compacts and/or perforates and/or cuts objects into pieces like, e.g., empty plastic bottles or aluminum cans which are returned by consumers.

Namely these containers typically still include a residual of their original content. This is typically a liquid with a high sugar content which crystallizes into sugar after a few hours at a corresponding temperature when left alone.

In these machines the processing is typically performed by running the objects or the containers between two counter-rotating and partially meshing rollers, wherein a perforation is typically provided for releasing the positive pressure so that the residual content exit from the container in this way, or even more so when the containers are cut into pieces so that the processing shaft is contaminated at least in its center portion, the operating portion.

Since the liquid also sprays against the outer walls and adheres to them, the liquid also reaches a circumference of the shaft journal which runs through the housing wall and which is supported in a bearing that is arranged on an outside of the housing wall.

In order to make it more difficult for the liquid to move along the bearing journal through the housing wall to the shaft bearing, it is also known to provide a bearing plate on an outside of the housing wall offset therefrom wherein the shaft bearing is arranged on an outside of the bearing plate in order to increase an axial distance between the center processing section of the shaft and the inside bearing.

Thus it is irrelevant whether the bearing plate which supports the bearing is additionally arranged outside of the housing wall and the housing wall is used as a splash protection wall, or the housing wall forms the bearing plate itself and an additional splash protection wall is arranged on an inside of the housing wall with an offset from the housing wall/bearing plate.

Independently therefrom the pass-through in the respective wall or plate for the shaft is sized as small as possible in order to make it more difficult in particular for liquid contaminants to penetrate in the axial direction along the shaft.

A synthetic material seal that contacts the shaft can also be respectively provided in the pass-through, however, the seal is very quickly destroyed when the machine is started up again after it has been sitting overnight which allows the sugar to crystallize.

III. BRIEF SUMMARY OF THE INVENTION a) Technical Object

Thus, it is an object of thee invention to provide a bearing arrangement and a processing device configured therewith which substantially prevents a penetration of contaminants from the center processing section of the processing shaft to its end side bearings.

Solution

The object is achieved according to the invention in that not only a path length for contaminants from the processing portion of the shaft to the bearing arrangement is increased which has the disadvantage of increasing the bearing distance and thus requiring higher stability of the shaft but by providing a wiping device there between which removes contaminants from the processing shaft again in this wiping section wherein the contaminants have penetrated in a direction towards the bearing.

With respect to the bearing arrangement the object is achieved by improving upon the generic bearing arrangement according to the preamble of claim 1 in that a wiping device with a wiper is provided between the bearing plate that is axially offset from the processing shaft and a splash protection wall and wherein the wiper contacts the shaft directly or indirectly, thus the shaft itself or a shaft portion that is attached torque proof on the shaft like, e.g., a ring, in particular a circular disk, and wipes off contaminants at this location.

The splash protection wall can be made from two parts which overlap in particular in elevation, wherein the splash protection wall advantageously freely terminates in a downward direction and/or the two components approach the entire circumference of the processing shaft from two sides.

When a separate shaft element is attached on the wiping section of the shaft and co-rotates with the shaft, no gap must be provided between the co-rotating portion, like, e.g., the disk or the ring and the shaft, so that contaminants can axially penetrate through the gap between the outer circumference of the shaft and the inner circumference of the component axially attached thereto torque proof since the wiper contacting the outer circumference or a radial surface is ineffective in this respect.

Subsequently only contacting the processing shaft is recited which implies that the contact can also be performed at a separate shaft element that co-rotates with the processing shaft and is attached tight thereto and arranged in a section of the processing shaft.

A non-rotating wiper can contact a rotating circumferential surface or face, thus in particular a radially oriented face or annular surface, or also a wiper that rotates about another rotation axis that differs from the rotation axis of the shaft.

The wiper that does not co-rotate with the shaft to be wiped is subsequently designated as a stationary wiper, though It can be advantageously moveably attached in an axial direction, thus the direction of the rotating axis of the shaft, in particular so that it can always be kept in contact in an axial direction at the shoulder or a radial surface of the processing shaft by a preload, in particular by a spring, even when the processing shaft goes through a temperature induced length expansion in particular on a side of the floating bearing, less so on the side of the thrust bearing
and/or
Wherein the wiper is pivotable within limits about a pivot axis which is arranged, e.g., parallel to, a rotation axis of the processing shaft in order to contact the circumference of the processing shaft with a preload.

A stationary wiper of this type is advantageously configured plate shaped and movably supported in the axially direction at an axially extending support, in particular a support rod. This support, in particular the support rod, is attached directly or indirectly at the splash protection wall of the bearing plate, in particular bolted down between two opposite bearing plates.

In particular at a front wall of the wiper and/or along the circumferential contour of the wiper, a wiper edge is configured as a front end of a wiper protrusion that is formed at an acute angle, advantageously an acute angel of less than 45°, wherein the wiper edge contacts the wiping section axially and/or radially.

The circumference of the processing shaft where the wiper edge contacts in the radial direction can be a base of a circumferential groove that is configured at the wiping section of the processing shaft. The radial shoulder where the wiper edge contacts in the axial direction can be the side flank of the circumferential groove, wherein the wiper can also only contact one of the side flanks or can engage alternatively both flanks of the rotating groove due to the wiper being attached with a clearance.

However, a separate in particular plate shaped wiper can contact each of the two side flanks of the circumferential groove. The axial preload can be applied by a compression spring between the two wipers in the axial direction.

A preload can also be provided for a radial contact of the wiper at a circumference, e.g., a preload by a torsion spring, which preloads the wiper that is supported at a circular support rod in the contact direction against the circumference.

The wiper should also contact the circumference radially advantageously below a center of its circumference in order to make wiped off contaminants which disengage from the wiper drop downward more easily.

A wiper, however, can also move relative to the shaft to be cleaned, in particular rotate about a rotation axis which is, for example, parallel to the rotation axis of the shaft to be cleaned and offset there from.

Thus, a rotating wiper of this type which is advantageously configured as a wiper disk, which then advantageously has a circular circumference and a radially outward oriented typically annular face, engages a radially oriented shoulder, a contact surface of the wiping section of the shaft in the axial direction.

In this respect it is clear that the contact surface of the shoulder on a side of the processing shaft or on a side of the wiper which cooperate are designated as radially oriented also when they are only primarily radially oriented, thus deviate from the radial direction by up to =1-45°.

Thus the two shoulders or radially oriented surfaces overlap in the radial direction. Thus, there is always a relative velocity even when the two shoulders rotate in opposite rotation directions, thus one shoulder rotates clockwise and the other one rotates counterclockwise or only one shoulder rotates.

Since the rotating wiper typically has a circular outer circumference a radial contact of the rotating wiper at a circumferential surface of the shaft to be cleaned or at one of its components is not useful.

Advantageously the two shoulders or faces that are in axial contact with each other are respectively configured at one wiper disk wherein one respective wiper disk—in case there are two processing shafts that rotate about parallel axes of rotation—is arranged on one of the two shafts torque proof in the wiping section and the two shoulders or faces contact each other axially.

Since the processing shafts shall typically have identical movement directions at a circumference in a pass through between the shafts, the wiper disks typically also have opposite directions of rotation.

In an advantageous embodiment at least the rotating wiper, in particular also the outer circumference defining the radial shoulder at the disk to be cleaned, includes one or plural radial notches that are respectively distributed over the circumference in order to be able to better release firmly adhering hard contaminants. Thus in particular one of the flanks of the indentation is configured much flatter relative to the radial direction than the other flank, advantageously the forward flank in the rotation direction is arranged flatter relative to the radial direction than that of the rear flank.

Advantageously the two wiper disks are configured identical and are only attached on one of the two respective shafts with radial surfaces thus annular surfaces that are oriented in opposite axial directions.

The radial shoulders or radial surfaces, in particular annular surfaces about the rotation axis, do not have to be at a right angle to the rotation axis but can also be configured conical, wherein the two surfaces that run in contact with each other have to have inverse cones.

Thus one of the two faces can be oriented perpendicular to its rotation axis, whereas the other face can have a rotation symmetrical, e.g., conical centric notch, so that the other face only contacts the opposite face with a circumferential edge.

When two wipers, in particular wiper disks, are arranged torque proof at one respective processing shaft of the two processing shafts, each wiper functions as a wiper relative to the other disk.

Simultaneously it is prevented for the wiper disk that is further remote from the operating portion of the shaft that contaminants migrate further outward in the radial direction at the radial shoulder and reach the radial outer end of the radial shoulder and in particular liquid or pasty contaminants flow gravity induced in downward direction towards the bearing journals of the shaft at this location, e.g., when the machine stands still.

Thus the two axially contacting wiper disks form a type of labyrinth seal, even when they do not contact the circumferential edge contacting the other shoulder with their wiper edges.

In a particularly advantageous embodiment non-rotating wipers and rotating wipers can also be combined, in particular when the bearing arrangement supports two rotating processing shafts that are arranged parallel to one another.

On the one hand side a non-rotating wiper can contact radially at a circumference and optionally traditionally axially at a shoulder, advantageously for each of the two shafts.

Independently there from whether the circumference where the non-rotating wiper contacts is the base of a circumferential groove or an axial piece of the shaft between two disks that are axially slid onto the shaft, to respective rotating wipers or wiper disks of the respective other shaft can additionally contact flanks of the groove and mesh therewith, and also on an annular face of a ring in which a circumferential groove of this type is configured.

Eventually one, two or more of the wiper disks can be arranged offset in an axial direction in a wiping section of each of the two shafts wherein each of the wiper disks engages one of the wiper disks on the other shaft, and axially between plural disks on one shaft one or plural non-rotating stationary wipers can radially engage at the circumference of the respective shaft.

In order to provide additional optimization additional stationary wipers can be used when using rotating wipers which, however, do not engage the processing shaft but engage the rotating wiper, in particular in its radially outer portion, and there at an outer circumference and/or in the other portion of a radially extending shoulder or face.

With respect to the processing device in which the at least one rotating processing shaft is used, the object is achieved in that the bearing arrangement is configured as recited supra.

Advantageously in a processing device of this type non-rotating wipers are also used at the processing shafts in their processing section, thus their center portion where they engage the objects to be processed.

Then the at least one wiper that is used in the wiping section and is stationary and does not rotate is advantageously identical with the wipers that are used in the operating portion.

This way a liquid contamination that reaches the wiping section in this manner during operation is removed from the at least one wiper and drips off from the at least one wiper when a certain amount has been reached.

Advantageously the space below the wiping device is large enough and configured to receive a larger amount of contaminants and in particular easily accessible for cleaning the wiping device and in particular includes a capture container for the contaminants below the wiping device.

In particular the preloading of the wipers in the contact direction against the surfaces to be cleaned assures that the sugar that adheres strongly after idle time and crystallizing from the liquid is reliably disengaged by the wiper edges and can be removed from its location of adherence.

A slinger effect of the rotating wiper is then possible again since the speed Is too small when a co-rotation of the processing shaft is provided and furthermore also not desirable since the contaminants would be ejected in all radial directions. Therefore, the speed of the rotating wiper is kept below 100 revolutions/minute.

For the processing device it is also irrelevant whether the further outward bearing plate or the further inward splash protection wall or none of the two components of the housing of the operating device, in particular of the feed funnel for objects to be processed, leads to the operating portion of the rollers, in particular which of them is a load bearing component of the housing of the processing device.

c) Embodiments

Embodiments of the invention are subsequently described with reference to drawing figures, wherein:

FIG. 2a illustrates a transversal view of the bearing arrangement according to FIG. 1a;

FIG. 2b illustrate an axial sectional view along the bearing arrangement of FIG. 1a;

Figure 1A:
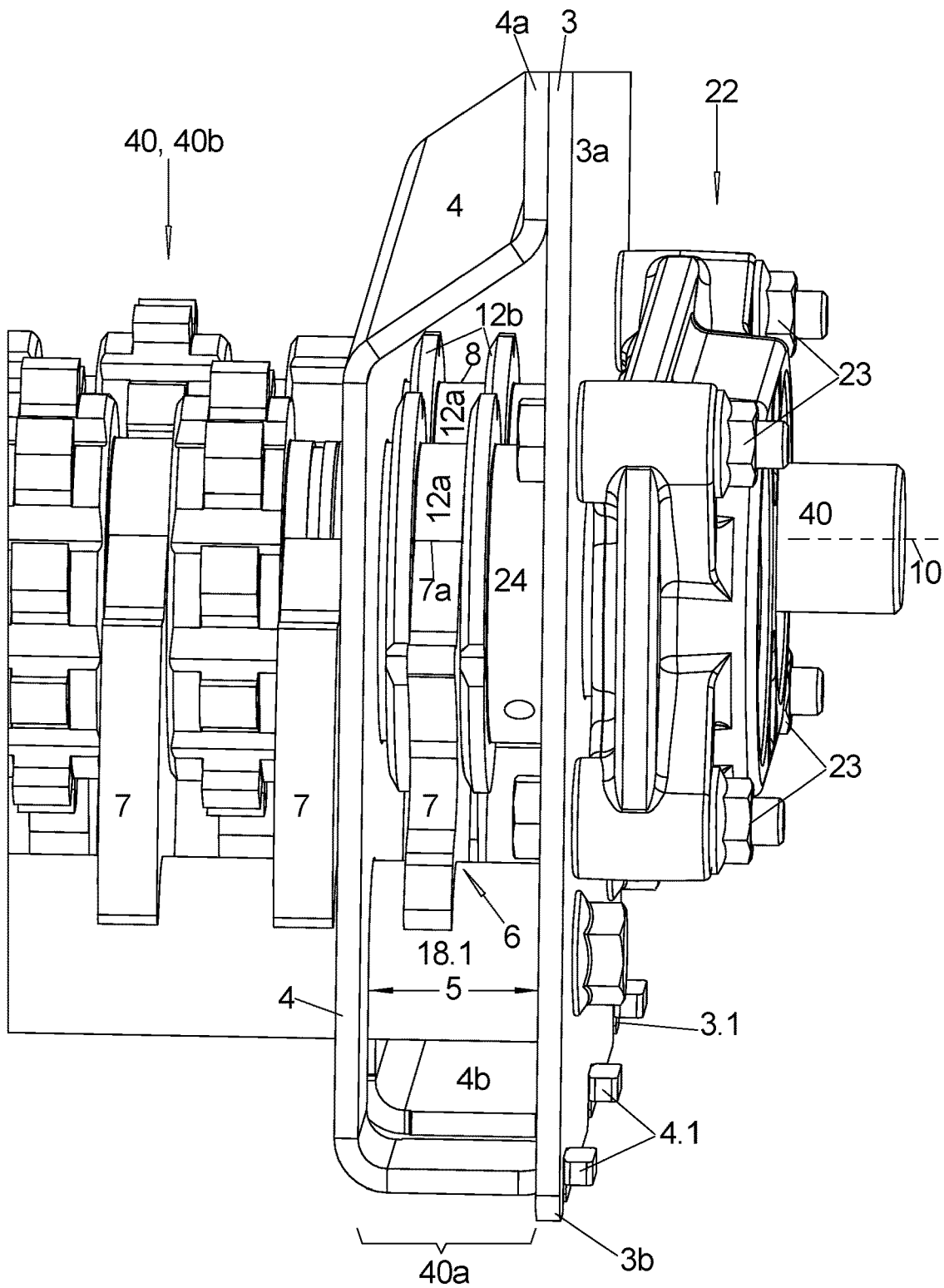
FIG. 1a illustrates a first embodiment of the bearing arrangement in a perspective view
Figure 1B:
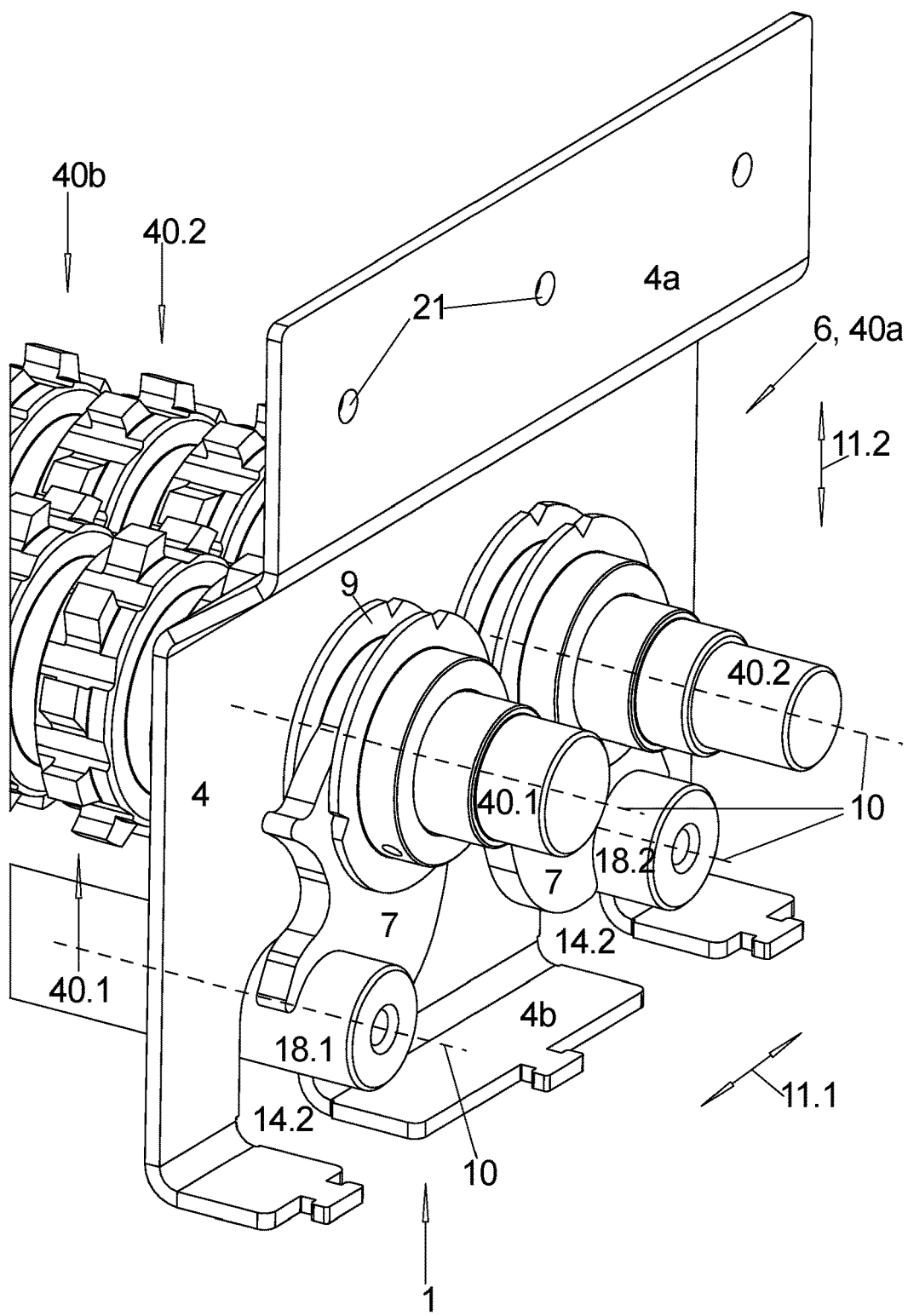
FIG. 1b illustrates a perspective view of the partially disassembled bearing arranged of FIG. 1a looking at the wiping device.
Figure 2A:
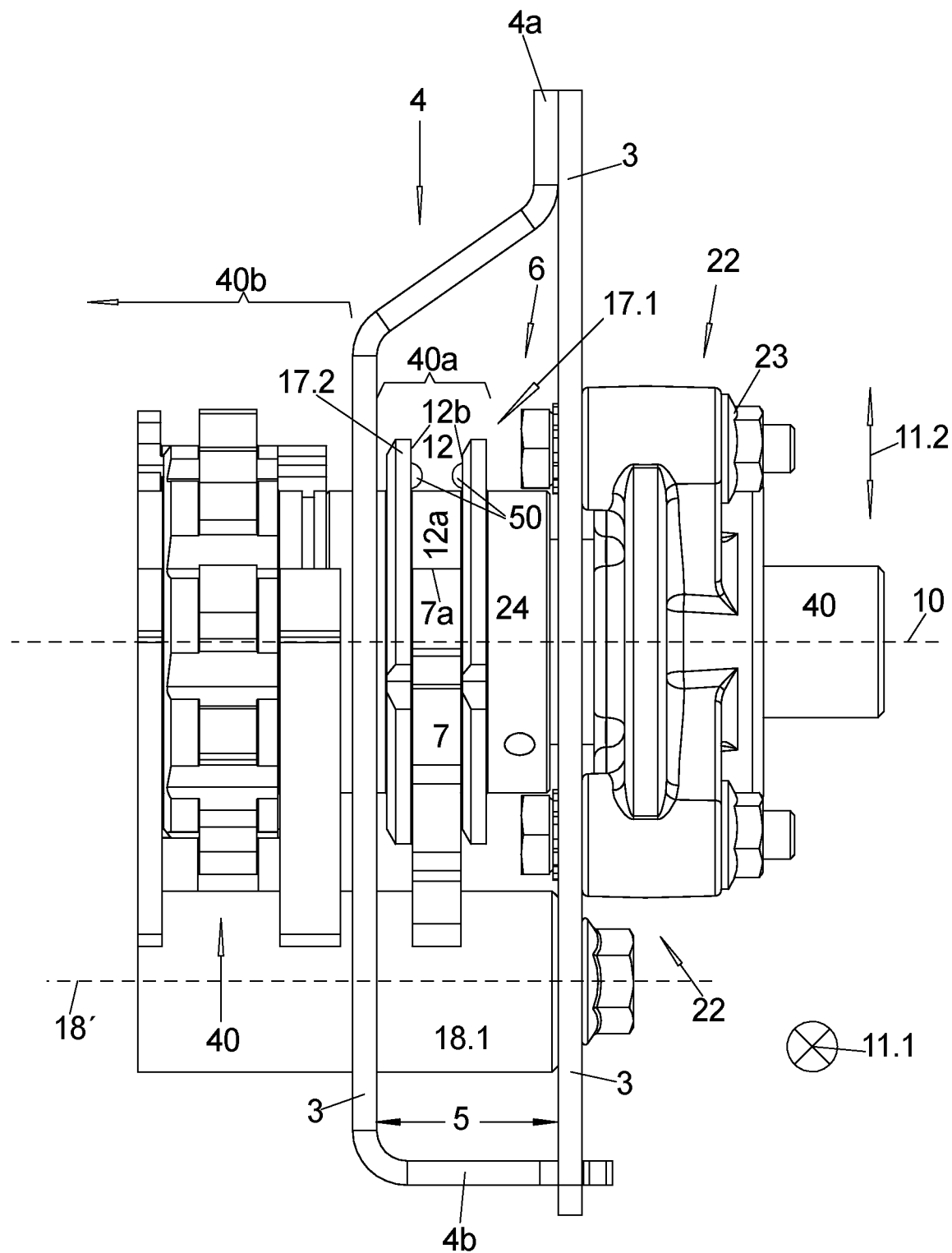
Figure 2B:
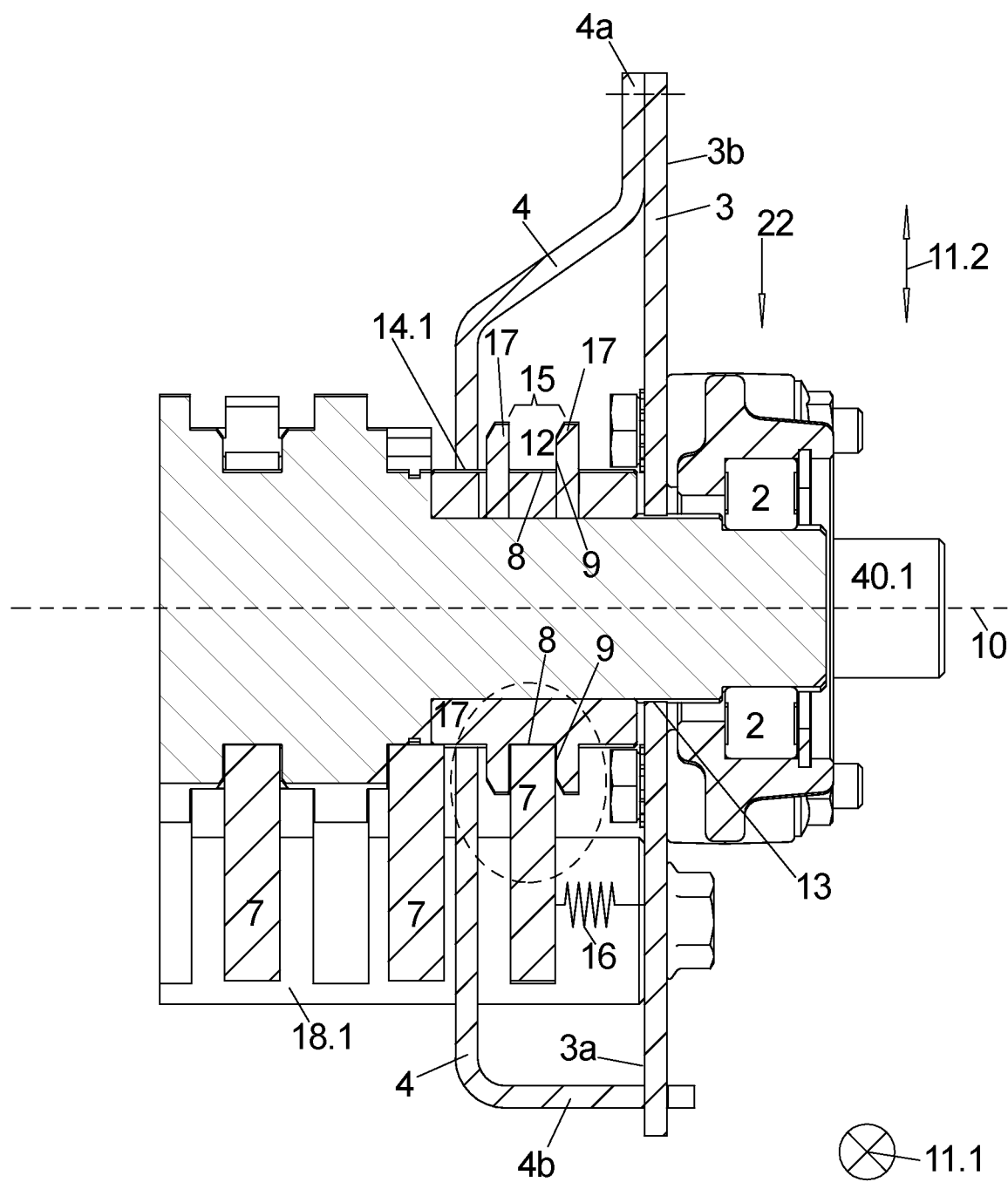
Figure 2C:
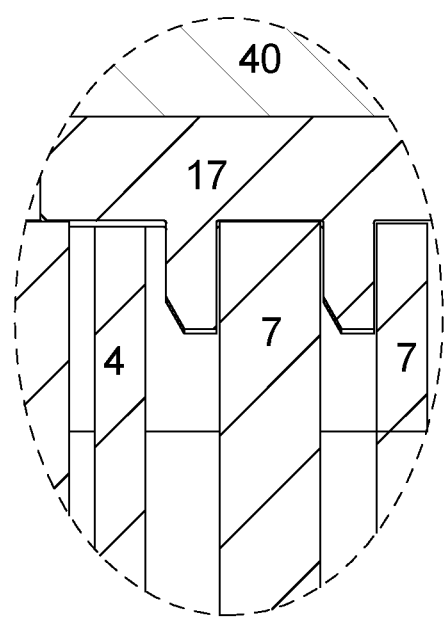
Figure 3:
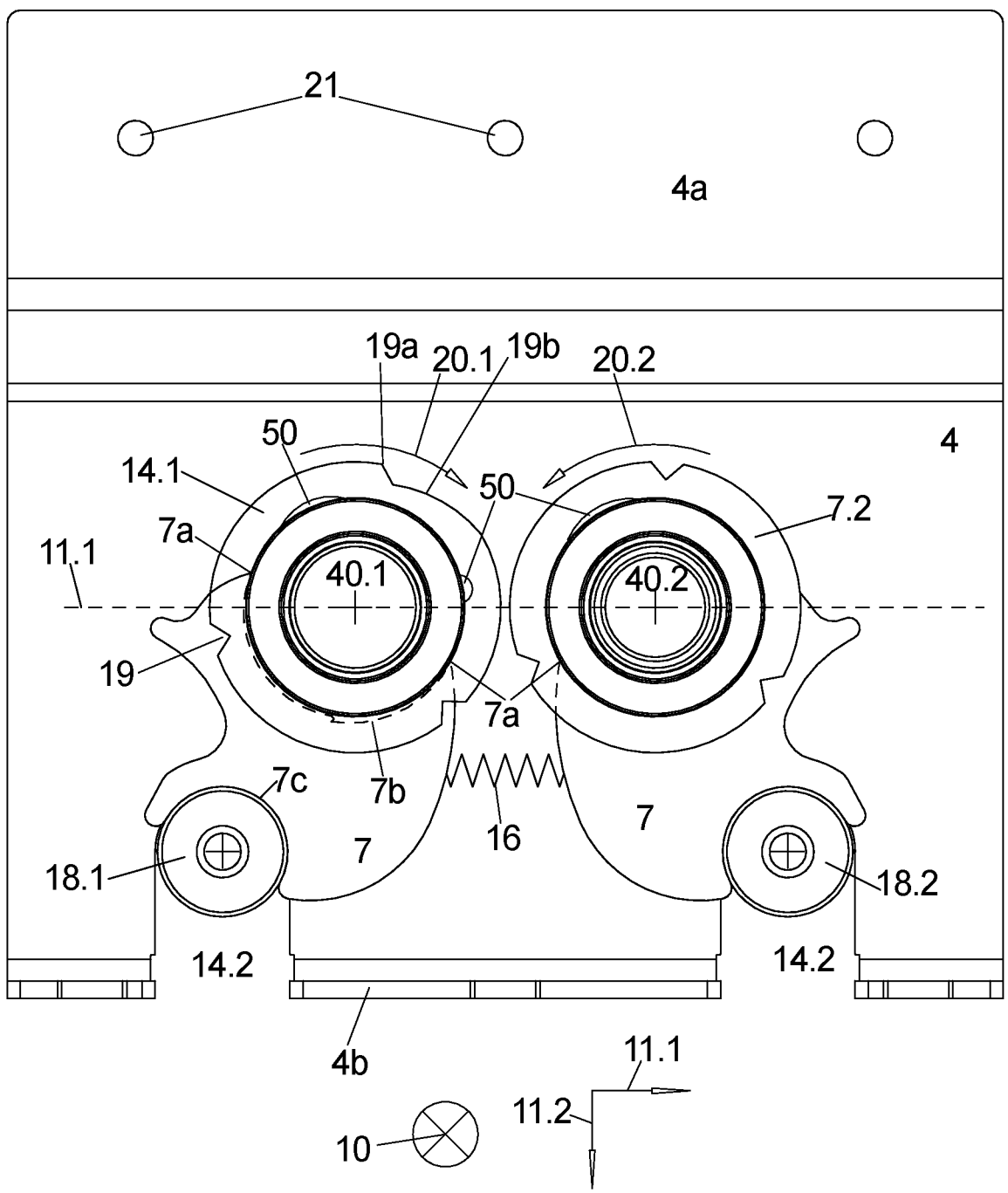
Figure 4A:
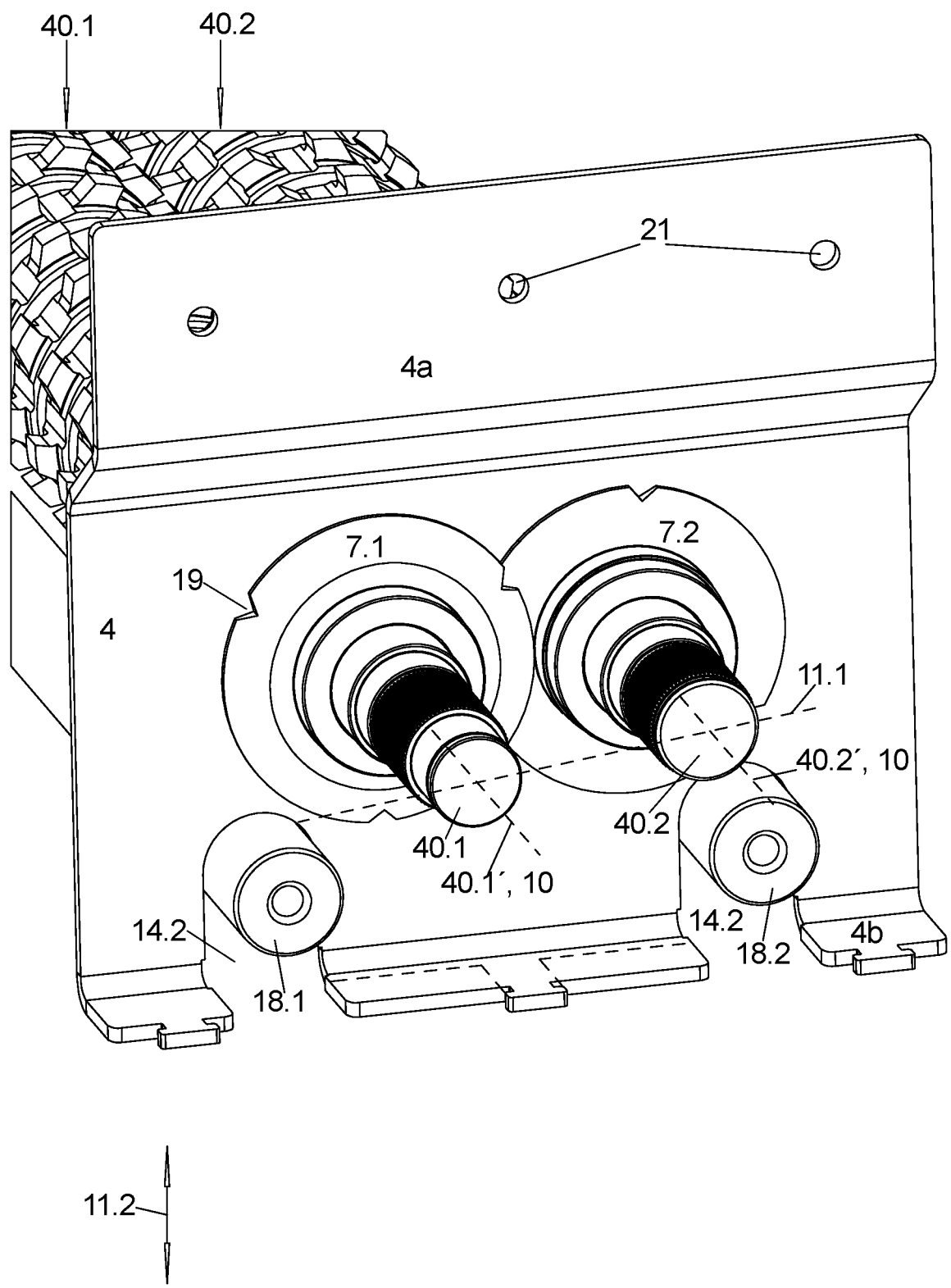
Figure 4B:
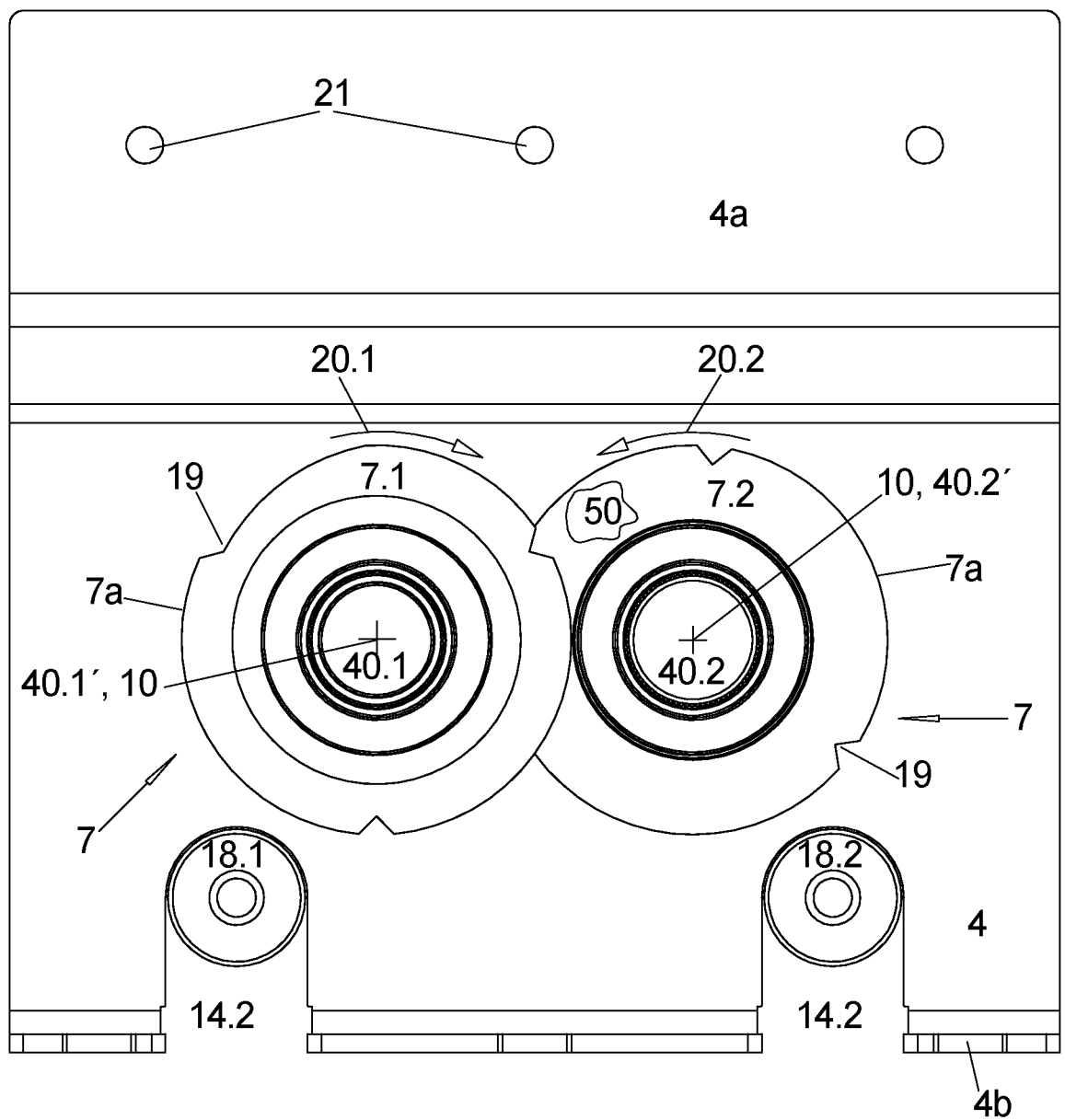
Figure 5B:
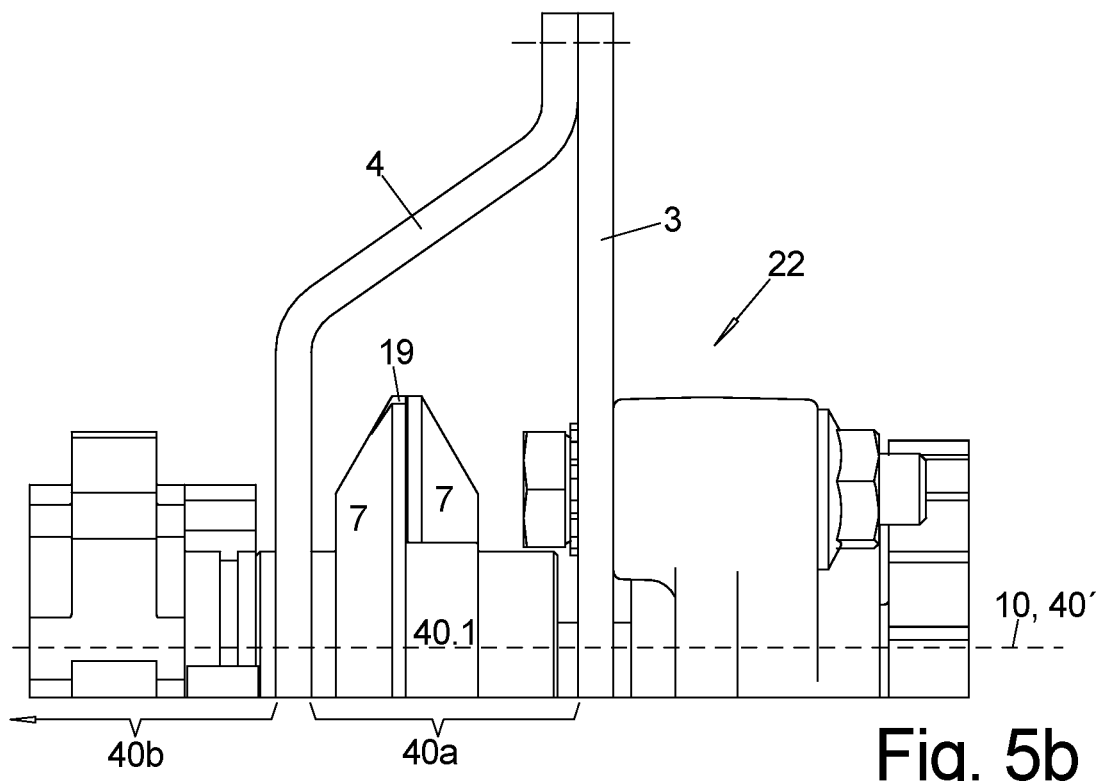
Figure 5A:
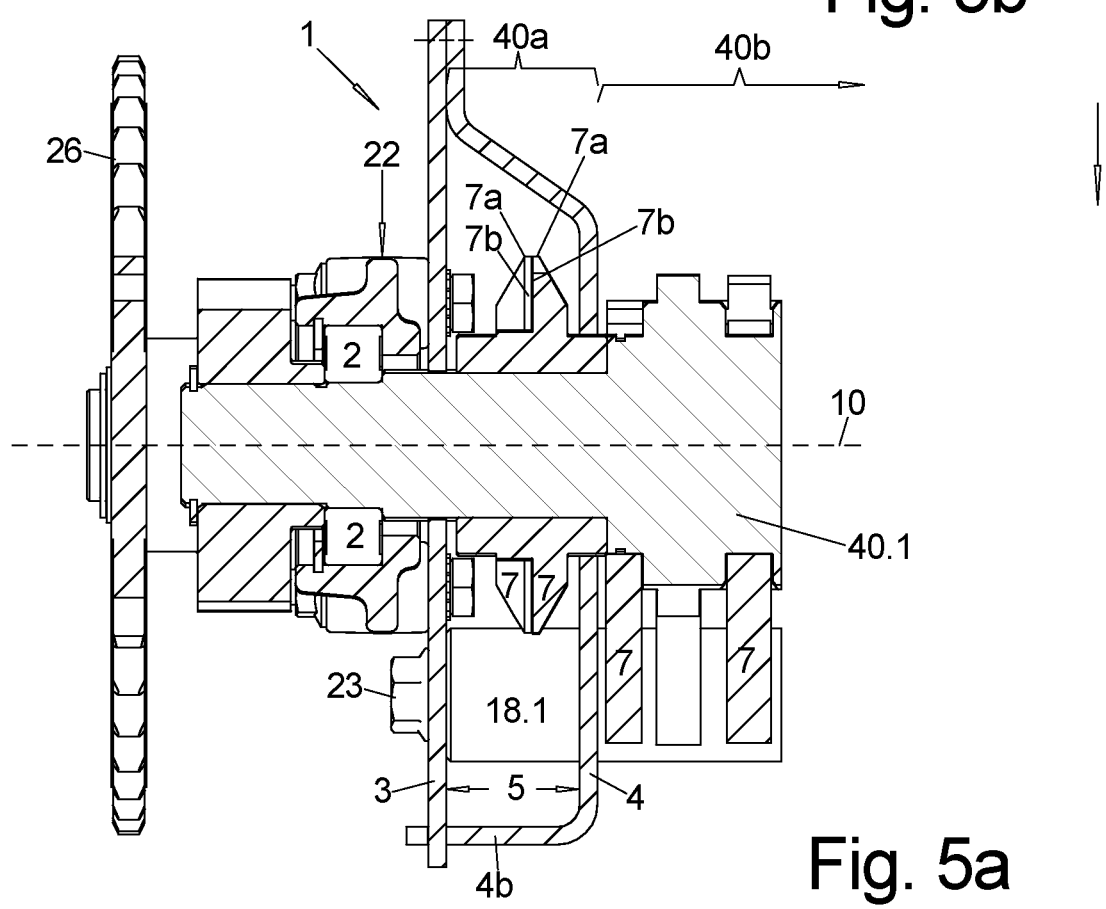
Figure 6A:
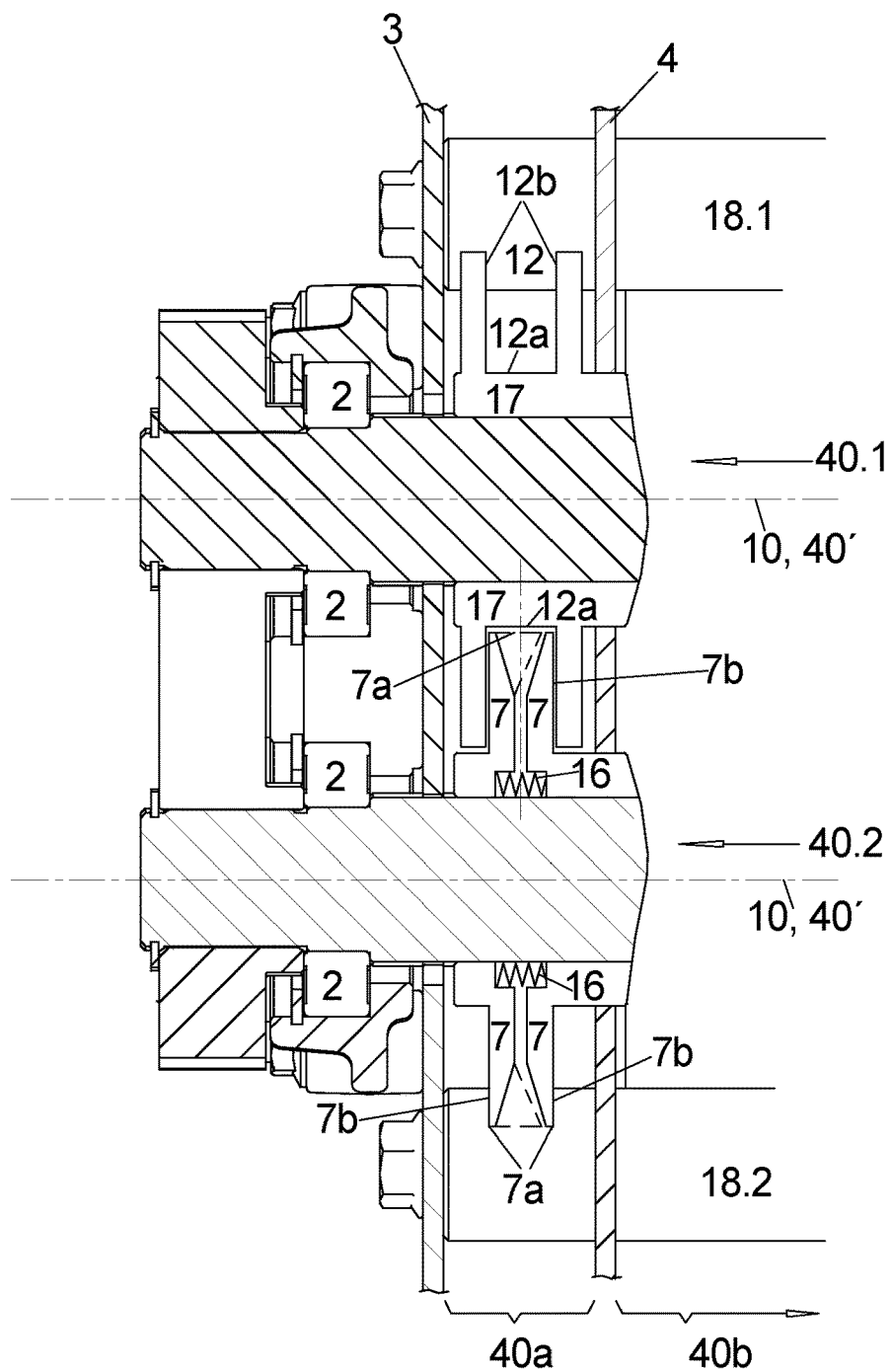
Figure 6B:
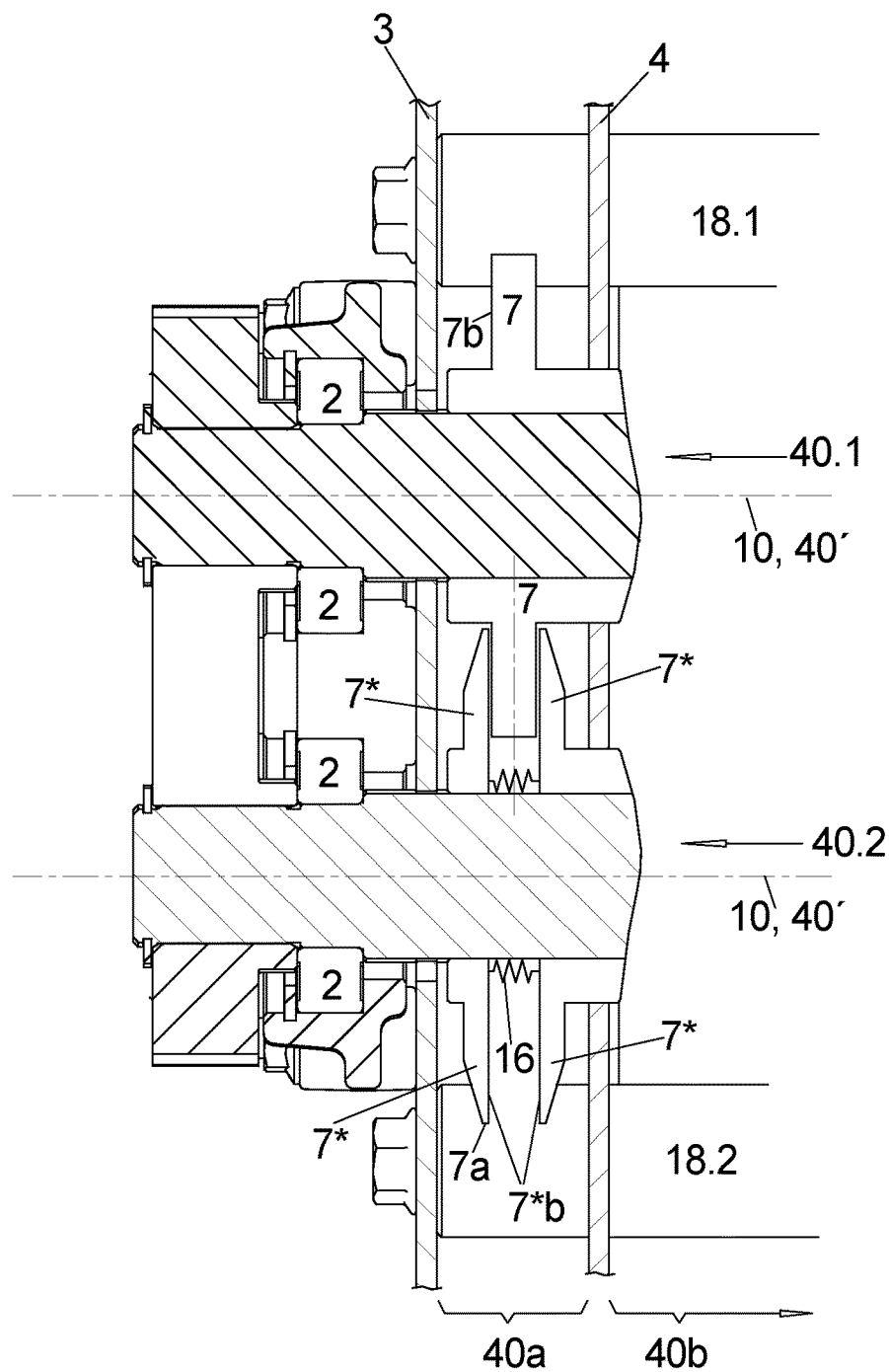
Figure 7:
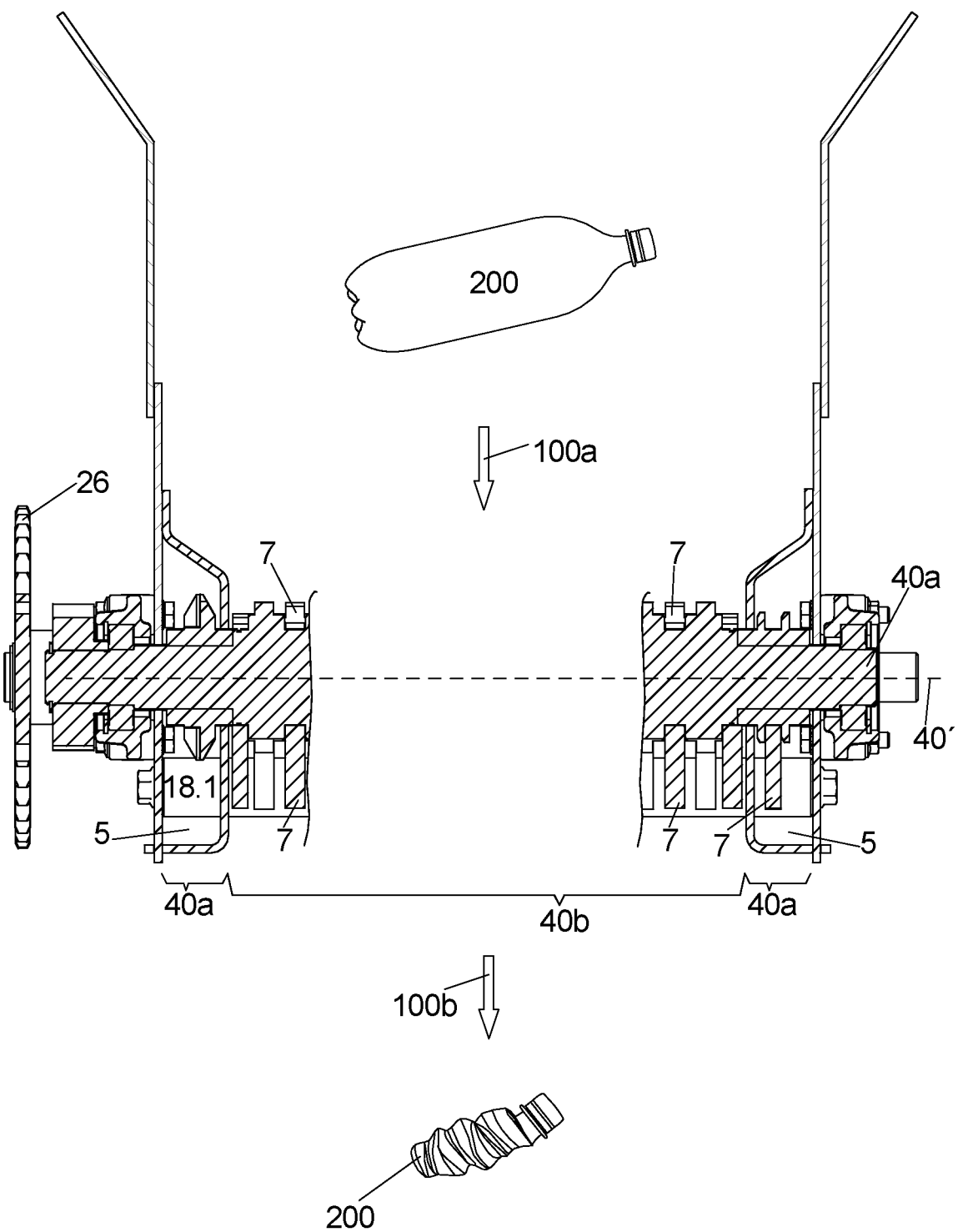
Figure 8A:
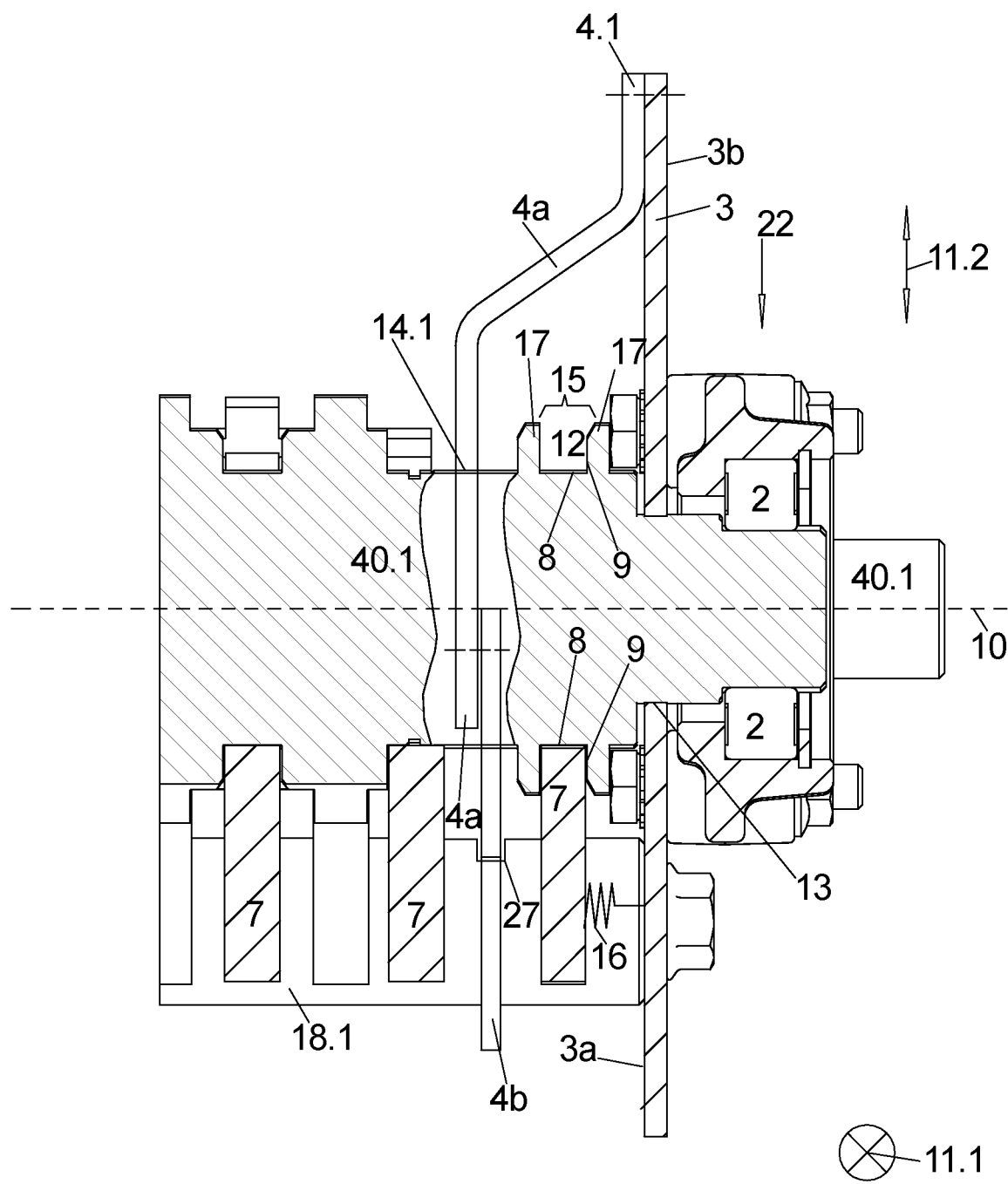
Figure 8B:
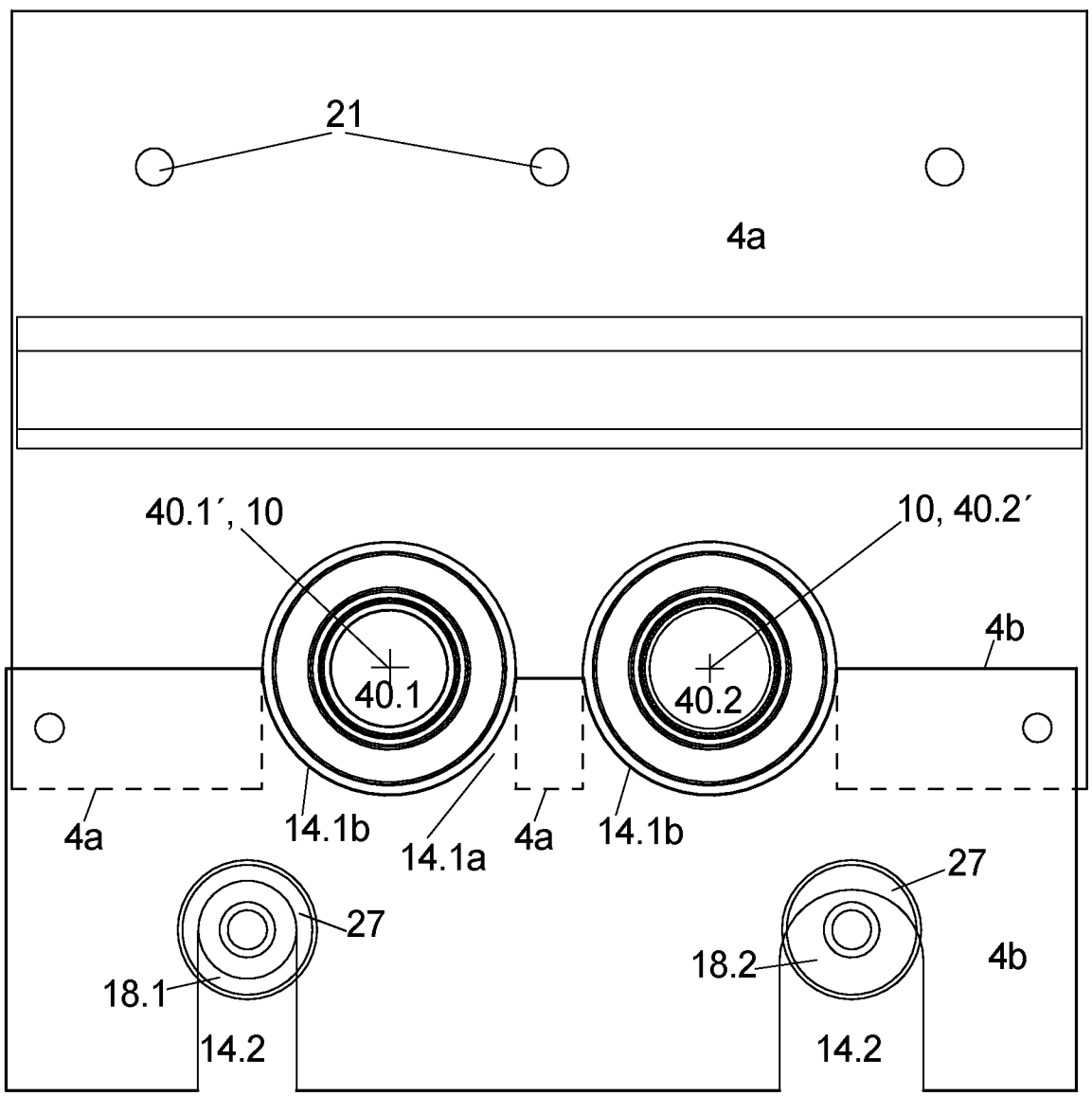

FIGS. 2c, d illustrates a blown up alternative embodiment of the wiping device according to FIG. 2b;

FIG. 3 illustrates the partially dismounted bearing arrangement of FIG. 1b viewed in an axial direction;

FIG. 4a illustrates a perspective view of a partially dismounted second embodiment of the bearing arrangement;

FIG. 4b illustrates the partially disassembled bearing arrangement of FIG. 4a in an axial view;

FIG. 5a illustrates an axial sectional view through a second embodiment of the bearing arrangement;

FIG. 5b illustrates a transversal view of the bearing arranged according to FIG. 5a;

FIG. 6a illustrates a longitudinal sectional view of a second embodiment of the bearing arrangement that is an alternative to FIG. 5a;

FIG. 6b illustrates a longitudinal sectional view of a second embodiment of the bearing arrangement that is an alternative to FIG. 5a and FIG. 6a;

FIG. 7 illustrates an axial sectional view of a processing device;

FIG. 8a illustrates an axial sectional view along a third embodiment of a bearing arrangement;

FIG. 8b illustrates a partially disassembled bearing arrangement according to FIG. 8a viewed in the axial direction;

The bearing arrangement 1 is illustrated in all drawing figures with reference to the support of 2 processing shafts 40.1, 40.2 subsequently designated as shafts that are parallel and adjacent to each other and rotate about an axial direction 10 which as illustrated e.g. in FIGS. 1b and 4a have axially offset portions with larger and smaller outer diameters thus between their 2 end side bearing arrangements. Which however is operating cross section 40b thus between which however is irrelevant for the instant invention and wherein additionally the portions with the greater outer diameter are configured serrated in the circumferential direction, wherein the 2 shafts 40.1 and 40.2 are arranged so that they mesh with each other with their portions of greater and smaller diameters.

Thus, objects 200 can be pulled between the two shafts 40.1 and 40.2 running against each other as illustrated for an operating device 100 in FIG. 7 between the 2 shafts 40.1 and 40.2 which are at least compressed by the 2 shafts 40.1, 40.2 and typically also perforated. The pull through is typically performed gravity supported top down.

The housing of the operating device 100 typically includes a feed opening 100a that is open at the top side for feeding the objects 200 to be processed and at a lower end an outlet opening 100b for the objects 200 to the compacted is visible from FIG. 7.

The two shafts 40.1 40.2 are supported at each of their ends in a common bearing plate 3 and on their insides a splash guard 4 is attached that also continues over both shafts 40.1, 40.2. The shaft assembly that includes the 2 bearing plates 3, optionally longitudinal struts connecting the 2 bearing plates 3 and the two splash guard walls 4 and the shafts 40.1 40.2 including the bearings 2 and the subsequently described wipers 6 is bolted by suitable attachment lobes against the housing of the processing device 100 and can be retrieved as a sub assembly from the processing device 100 after disassembly.

Additionally wiper supports configured as wiper bars 18 are provided in all figures parallel below and with respect to the center between both shafts 40.1, 40.2 slightly further outside in the same longitudinal direction 10, thus parallel to the shafts 40.1, 40.2 wherein the wiper support has a circular outer circumference in this case.

The wiper 7 that are visible in particular in FIGS. 2b and 5a that are provided in the processing section 40b are arranged in a form locking manner between a respective wiper rod 18.1 or 18.2 in a form locking manner and one of the sections with smaller outer diameter of the adjacent shaft 40.1 or 40.2.

The plate shaped wipers 7 respectively include an approximately semicircular recess at opposite end portions wherein the outer contour of the wiper rod 18.1 or 18.2 fits into one recess and the outer circumference in the axial section of the shaft 40.1 or 40.2 where the wiper contacts fits into the other recess.

The recess that contacts the shaft 40.1 or 40.2 terminates respectively with a wiper edge 7*a* which contacts the respective outer circumference of the shaft 40.1, 40.2 in any case in order to remove contaminants 50 that are provided at this location even when the recess oriented towards the other circumference of the shaft 40.1, 40.2 is otherwise greater than the outer circumference of the shaft and the entire recess does not contact the outer circumference of the shaft 40.1 and 40.2.

FIGS. 1*a*-3 illustrate a first embodiment of the bearing arrangement 1 where a wiper 7 contacts an outer circumference of the shaft 40.1 or 40.2 in a wiping section 40*a* that is axially offset from the processing section 40*b* and arranged between the end side bearing 2 and the processing section 40*b* of the shaft wherein the wiper like the wiper 7 in the processing step 40*b* does not rotate but is supported in a form locking manner between the wiper rod 18.1 or 18.2 and the adjacent shaft 40.1 or 40.2 but move able in the axial direction 10 along a wiper rod 18.1 and 18.2 supporting it and advantageously also pivot able about the wiper rod 18.1 or 18.2.

With respect to the outer contour and/or the thickness and/or other factors like e.g. material the wiper 7 that is used in the wiping portion 40*a* can also be identical to the wipers 7 that are used in the operating portion 40*b* of the shafts 40.1 or 40.2.

As evident from FIG. 1*a*, 1*b* a splash guard 4 is arranged between the processing section 40*b* and the wiping section 40*a* wherein the shafts 40.1 and 40.2 reach through the splash guard wall 4 and furthermore the bearing plate 3 is arranged between the wiping device 6, thus the wiping section 40*a* of the shafts 40.1, 40.2 and the bearing 2 and its bearing receiver 22 wherein the bearing receiver 22 for the bearing 2 is arranged on an outside of the bearing plate thus on a side that is oriented away from the splash guard wall 4 and the processing section 40*b*.

Thus, not only the bearing plate 3 is arranged between the bearing 2 and the processing section 40*b* of the shafts 40.1, 40.2 but also the splash guard wall 4 both of which made the penetration or contaminants 50 from the processing section 40*b* to the bearing 2 more difficult and this is rendered even more difficult by the wiping device 6 which is arranged in the offset 5 between the two plates 3, 4.

This offset 5, however, in this case is not closed on all sides but advantageously respectively open on a face side in a direction in which the two shafts 40.1, 40.2 are arranged behind one another which is the first transversal direction 11.1 and only closed completely on the top side and partially closed on the bottom side.

It is evident that this is achieved in that the splash guard 4 is configured approximately U-shaped in the first transversal direction 11.1 and attached with its open side so that the open side is oriented towards the bearing plate 3. For this purpose the approximately U-shaped cross section of the splash protection wall 4 has a protrusion on the top side which protrusion extends approximately in a direction of the connecting U-shape wherein the protrusion contacts an inside of the bearing plate 3 and can be bolted together with the bearing plate 3 by bore holes 21 that are provided in this arm of the splash protection wall 4.

At the lower end the splash protection wall 4 is advantageously attached in a form locking manner at the bearing plate 3 in that a lower freely terminating arm of the profile of the splash protection wall 4 that is oriented towards of the bearing plate 3 has protrusions which can be inserted bottom up into downward open recesses 3.1 in the lower end of the bearing plate 3 and which are supported in a form locking manner is 5 out of 6 dimensions in space due to a broadened inside head of the protrusions 4.1.

As evident from FIG. 2*b* the bearing receiver 22 is configured annular and is supported by four threaded connection 23 that are distributed over the circumference and otherwise supported at a distance from the outside 3*a* of the bearing plate 3 so that contaminants can drain in downward direction through the offset provided there between. The bearing receiver 22 this an outward oriented shoulder where the bearing 2 that is inserted from an outside can be applied and is secured in this position by a retaining ring that is introduced from an outside.

Furthermore downward open pass through openings 14.1, 14.2 are provided in the splash guard wall 4 wherein wiper rods 18.1, 18.2 extend through their upper ends so that the wiper rods can be pulled in downward direction out of the splash guard plates 4 after a face side threaded connection relative to the bearing plate 3 at whose inside 3*a* the wiper rods terminate has been disengaged.

The pass through openings 13 in the bearing plate 3 through which one of the shafts 40.1, 40.2 extends however are circumferentially closed pass through openings as well as the pass through openings 14.1 for the pass through of one respective shaft in the splash guard wall 4, both are additional sized so that they reach as close to the outer circumference of the shaft 40.1, 40.2 as possible however without touching as close to the outer circumference of the shaft as close as possible, however without touching it so that a labyrinth seal is formed.

However the configuration of the wiping device 6 is essential for the invention wherein the wiping device 6 is arranged in the intermediary space 5 between the splash guard wall 4 and the bearing plate 3.

At this location a ring groove 12 is configured in a ring 17 that is attached torque proof on an outer circumference of the respective shaft 40.1, 40.2 as illustrated in FIG. 2*b*, lower half, alternatively integrally in one piece directly in the outer circumference of the shaft 40 in which a plate shaped wiper 4 engages whose width measured in the axial direction 10 is slightly smaller than a width of the ring groove 12 wherein the plate shaped wiper 7 engages the ring groove 12 and is retained between the wiper rod 18 and the shaft 40.2 or 40.2 as described supra with reference to the operating portion 40*b*.

In this case the ring 17 penetrates the splash guard 4 however it terminates in front of the inside 3*a* of the bearing plate 3.

As evident in the axial view of FIG. 3 the recess 7*b* in the circumferential contour of the wiper 7 either contacts the outer circumference of the shaft 40.1 or 40.2 however it can also extend in portions at a distance therefrom, however at least one of the wiper edges 7*a* shall either contact an outer circumference of the shaft 40.1, 40.2 or a circumference 8 of the ring 17, namely the base of the ring groove 12 and thus advantageously the wiper edge 7*a* which is oriented against the rotation direction 20.1 or 20.2 of the shaft 40.1, 40.2, thus the wiper edges are arranged at a front end of the wiping protrusion which is arranged between the recess 7b and the rest of the circumferential contour of the wiper 7 wherein there are two wiper edges.

Since the directions of rotation of the two shafts 40.1, 40.2 are opposite to each other according to FIG. 3 and thus so that they are oriented against each other in the upper portion the lower wiper edges 7a of the two wipers 7 that are advantageously arranged between the two shafts 40.1, 40.2 shall contact the outer edge of the respective ring 17 in order to have the desired scraping effect and to wipe off contaminants 50 from the shaft 40.1, 40.2 that are provided on the outer circumference.

For this purpose the two wiper edges 7a are radially preloaded against the outer circumference of the shaft as illustrated in FIG. 3, e.g. by a compression spring 16 that is arranged between the 2 wipers 7 and presses them away from each other and thus presses the two adjacent lower wiper edged 7a radially against the respective circumference 8, Instead or in a supplemental manner to this radial contact of the wipers 7 at the respective shaft 40.1, 40.2 also an axial contact at least at one radially flank 9, e.g. one of the flanks 12b of the ring groove 12 is desirable which in this case are annular surfaces that are parallel to each other and orthogonal to the axial direction 10 which however is not mandatory for obtaining the desired cleaning effect.

Since the wiper is preloaded in the axial direction 10 by a spring 16, against either of the flanks 12b the circumferential edge of the plate shaped wiper 7 contacts the corresponding shoulder 12 and strips contaminants 50 from the corresponding shoulder 12 as illustrated in an exemplary manner only in FIG. 2a.

FIG. 2b illustrates in the lower half that the ring 17 in which the circumferential groove 12 is fabricated can be configured integral in one piece or according to the upper half it illustrates that the ring groove 12 can also be formed by individual annular discs 17.1, 17.2 that are connected torque proof in the shaft 40.1, 40.2 which are kept at a distance e.g. by annular spacers 24 with a smaller outer diameter so that the distance 15 between the slices 17 forms the ring groove 12 and for example the outer circumference of the annular spacer 24 represents the circumference 8 where the wiper 7 that is pressed in contact in the radial direction contacts with its wiper edge 7a.

Figure 2D:
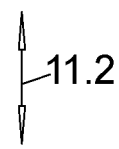
Figure 2D:
Figure 2D:
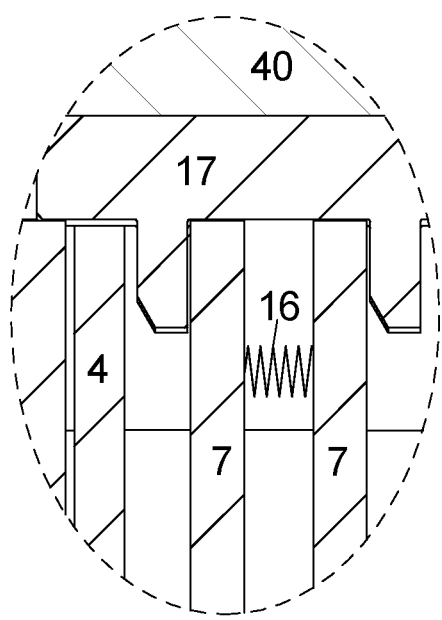

The enlarged details of FIGS. 2c and 2d of FIG. 2b show alternative solutions of the wiping device.

Thus, FIG. 2c illustrates that a stationary or rotating wiper 7 can be arranged in stead or in addition to the wiper 7 that penetrates the ring groove 12 and is stationary or rotates wherein the additional wiper contacts also on an outside of one of the two ring groove flank elements, e.g. of the discs 17 contacting their outside wherein the additional wiper 7 can contact the outside and/or also the circumferential portion of the adjacent to the outer flank.

FIG. 2d shows a solution where the ring groove 12 has a width so that two stationary or rotating wipers 7 penetrate the ring groove 12 that are arranged adjacent to each other with an axial offset there between wherein the wipers either contact one of the essentially radially extending flanks 12a, b and on the other hand side in case of a stationary wiper 7 contact their groove base 12a.

For this purpose the two wipers 7 are advantageously preloaded against each other in an outward direction in particular radially, e.g. by a spring 16.

It is appreciated for a non-exactly radial extension of the corresponding flanks 12b or of the outsides of the flank elements the side surfaces oriented in the axial direction of wipers 7 that contact at this location have to be oriented analogously and parallel to the outsides of the flank elements.

FIG. 3 furthermore illustrates that notches 19 can be provided in an outer circumference of the flank elements, e.g. of the annular discs 17.1, 17.2 which define the groove 12 and which facilitate a disengagement of contaminants 50 which the circumferential edge of the wiper 7 moves along from the annular discs 17.1, 17.2.

As illustrated for the right disc 17.2 in FIG. 3 the notches 19 can be V-shaped and oriented with a tip in particular to the rotation axis 40' of the respective shaft 40.1, 40.2, in particular they can also be configured symmetrical with respect two flanks.

On the other hand side a notch 19 is illustrated at the left disc 17.1 wherein one flank 19a of the notch extends at a much steeper angle to the radial direction than the other flank 19b, wherein the flatter flank 19b is the front flank 19b in the rotation direction so that the steeper rear flank 19a hits a piece of contamination 50 instantaneously and causes a high release force.

FIGS. 4a-7 illustrate a second embodiment where a rotating wiper 7 is used instead of a stationary wiper for cleaning the rotating surface.

As evident from FIGS. 4a, b where the bearing plate 3 and the bearing 2 is omitted relative to the illustrations according to FIGS. 5a, b in order to better show the wiping device 6 this embodiment of the wiping device 6 differs from the embodiment according to FIGS. 1a-3 in that a wiping disc 7.1, 7.2 is arranged torque proof of each of the 2 shafts 40.1, 40.2 wherein the wiping discs have an outer diameter that is large enough so that they overlap in the radial direction and so that they have a contact surface 7b that primarily extends in the radial direction advantageously exactly extends in the radial direction wherein they contact each other axially at least with the circumferential edge of the this contact surface 7b.

Advantageously the outer circumference of the discs 7.1, 7.2, however, is only sized so that they do not contact with their outer circumference at the radially opposite circumferential surface of the adjacent shaft 40.1 or 40.2 or of a ring 17 that is attached thereon torque proof but so that a radial gap 25 remains there between.

Additionally FIG. 5 illustrates the driven end of a shaft 40.1, which is implemented in that a sprocket 26 is attached torque proof on the shaft end wherein the sprocket extends axially beyond the bearing 2 and which can drive the shaft 40.1 by a non-illustrated chain that is run over the sprocket.

The described wiping devices 6 can be arranged at a driven as well as at a non-driven end of the respective adjacent bearing arrangement 1 of a shaft 40.1 and independently from the bearing 2 being an axially fixed bearing or an axially floating bearing, wherein in particular on a side of the axially loose bearing the axial preload of the wiper 7 or of the wiping disc 7.1, 7.2 against the primarily radially extending surface is important.

As illustrated in FIGS. 5a, b both wiping discs 7.1, 7.2 have a cross section that tapers conically towards a free end, wherein however a flank of the cross section continues flat over an entire radial extension, advantageously exactly in the radial direction and the flank of the cross section of the 2 wipers discs 7.1, 7.2 that are oriented towards each other and which continuously flat forming a contact surface 7b contact one another, wherein however at least a circumferential edge of this contact surface 7b functions as an axially contacting wiper edge 7a.

As evident from FIGS. 4a, b the two wiping discs 7.1, 7.2 which can have the same notches 19 at their outer circumference as described with reference to FIGS. 1a to 3 together with the shafts 40.1, 40.2 on which they are mounted torque proof so that they rotate counter acting so that they run towards each other in an upper portion.

Thus, each of the two axially contacting wiper edges 7a in this case the outer circumference which advantageously also has an axial extension as illustrated in 5a, b which however could also be configured as a cutting edge so that contaminants 50 are wiped off from the contact surface 7b and transports the contamination 50 through the gap 25 into a portion below the elevation of the shaft axes 40' where they advantageously drop gravity induced from the wiper edge 7a or remain at least at the contact surface 7b in its radially inner portion, but they cannot reach the radially outer circumference of the respective wiping disc 7.1, 7.2 or move over it in the axial direction 10.

Advantageously the lower arm of the splash guard plate 4 is also oriented against the bearing plate 3 is non continuous but interrupted also remote from the recesses 14.2 as drawn in dashed lines in FIG. 4a, so that contaminants 50 that drop down can drop through this arm in downward direction so that contaminants 50 that have just recently dropped down can collect in the free space between the bearing plate and the splash guard wall 4.

FIGS. 6a and 6b illustrate two additional variants of the wiping device according to FIG. 5a in a top view onto the 2 shafts 40.1, 40.2 that are arranged adjacent to each other.

FIG. 6a illustrates a ring 17 in the wiping section 40a that is mounted torque proof on the first shaft 40.1 and includes an annular groove 12 fabricated therein in analogy to FIGS. 1a-3.

On the other shaft 40.2, however two wiping dics 7.1, 7.2 are mounted wherein each wiping disc contacts one of the flanks 12b of the annular groove 12 with its advantageously radially extending annular contact surface 7b.

Additionally one of the wiping discs 7.1, 7.2 can have an outer circumferential surface 10 that is configured very wide in the axial direction and which functions as a radially contacting wiper edge 7a by which it radially contacts the base 12a of the groove 12.

Advantageously the two wiping discs 7.1, 7.2 are preloaded away from each other, e.g., by a spring 16 in the axial direction 10 and thus preloaded in a direction so they contact the two groove flanks 12b.

FIG. 6b illustrates an inverse solution where a wiping disc 7 is attached torque proof on one of the shafts 40.1 and co-rotates wherein the wiping disc includes two advantageously radially extending annular contact surfaces 7b.

On the other shaft 40.2 two wiping discs 7* are arranged in this wiping section 4a and mounted so that they are movable in the axial direction 10 along the shaft 40.2. Each of the two wiping discs 7* includes an advantageously radially extending annular contact surface 7*b by which it contacts the analogously oriented, in particularly radially extending, contact surface 7b of the wiping disc 7 of the other shaft 40.1.

Thus, advantageously a preload of the two axially offset wiping discs 7* of the first shaft 40.2 relative to the outer faces of the wiping disc 7 of the other shaft 40.1 is provided, advantageously by a tension spring 16 that is arranged between the two axially offset wiping discs 7*.

FIGS. 8a, b illustrate a third embodiment that deviates from FIGS. 1-3 in that the splashguard wall 4 is configured in two components in FIGS. 8a, b wherein the splashguard wall includes the upper wall portion 4a and the lower wall portion 4b that is bolted together with the upper wall portion 4a and thus overlaps vertically therewith in portions. The lower wall portion 4b is thus arranged on a side of the upper wall portion 4a that is oriented away from the processing section of the shaft 40.1, 40.2, thus the center portions of the shafts in their axially directions so that liquid that drips off from their lower edge in downward direction is run further downward from the lower wall portion 4b that is arranged further outside.

Thus, the lower wall portion 4b is advantageously only attached at the upper wall portion 4a which is configured with an elbow like in FIGS. 1-3 and attached with the upper attachment protrusion 4.1 at the bearing plate 3, however, not attached with its lower end at the bearing plate 3 but terminates freely in downward direction, in particularly downward, so that the portion f4b is advantageously a flat plate.

As illustrated in FIG. 8b, downward open pass-though openings 14.1a are received in the lower portion of the upper wall portion 4a for receiving one of the processing shafts 40.1, 40.2. The upper end of the pass-through openings 14.1a is configured approximately semi-circular and sized according to the diameter of the processing shafts 40.1, 40.2 at this axial position and fitted tight around the diameter of the processing shaft but without touching it so friction is prevented.

Flanks of the pass-through openings 14.1a extend from the semicircular contour and do not contract but extend parallel to one another or move even further apart in downward direction.

On the other hand side, the lower wall portion 4b includes analogous upward open pass-through openings 14.1b for receiving a respective processing shaft 40.1, 40.2. The lower end of the passthrough openings 14.1b is configured approximately semicircular and sized according to a diameter of the processing shafts 40.1, 40.2 at this axial position which they approach as closely as possible but which they should not contact in order to prevent friction.

The flanks of the pass-through openings 14.1b do not extend from this semicircular contour in a contracting manner they extend parallel to each other or in a contracting manner further upward.

In a vertical overlap portion of the two wall elements 4a, b, the two wall elements are bolted together as evident best from FIG. 8a.

Additionally pass-through openings 14.2 for receiving a respective wiper rod 18 are provided in the lower portion of the lower wall element 4b wherein the pass-through openings 14.2 where already described with reference to a one-piece splashguard wall 4 and are open in the downward direction.

The upper end of the passthrough openings 14.2 is adapted to an upper half of the circumferential contour of the wiper rods 18 at this axial position and configured and sized approximately semicircular in this case according to the diameter of the wiper rods 18 at this axial position, which they shall reach approach as closely as possible or even come in contact with since the wiper rods 18 do not rotate.

As illustrated in FIG. 8b in the left half, the wiper rod 18.1 has a circumferential groove 27 with a width according to the lower portion 4b which is engaged by the lower component 4b and thus stabilized in the axial direction.

The groove 27, however, can only be in an upper portion of the circumference of the wiper rod 18 as illustrated in the right half of FIG. 8b at the wiper rod 18.2.

This configuration facilitates assembly on the one hand side since the processing shafts 40.1, 40.2 can be mounted initially between the bearing plates 3, thereafter the two wall elements 4*a, b* are pushed from above or below against the processing shafts 40.1, 40.2 and can be bolted together or to the bearing plate 3. Thereafter the wiper rods 18 are inserted from below into the downward open pass-through openings 14.2 and bolted against the bearing plates 3.

However, the main advantage is that the splashguard wall 4 now envelopes the circumference of the processing shafts 40.1, 40.2 at this location completely and that the splashguard wall also functions as a wiper or a labyrinth seal against a penetration of liquid along the processing shaft 40.1 in a direction towards the outside bearings.

FIG. 8*a* shows additionally and independently from the two piece configuration of the splashguard wall that the co-rotating wiping discs 7 that are provided in the wiping section 40*a* together with the processing shafts 40.1, 40.2 are configured integral in one piece with the respective processing shafts 40.1, 40.2.

Thus, an axial length requirement of the wiping section 40*a* can be reduced so that an axial extension of the processing section 40*b* is increased.

REFERENCE NUMERALS AND DESIGNATIONS

1 Bearing arrangement
2 Bearing
3 Bearing plate
3.1 Recess
3*a* Outside
3*b* Inside
4 Splashguard wall
4.1 Protrusion
5 Offset, intermediary space
6 Wiping device
7,7*,7.1, 7.2 Wiper, wiper wiping disc
7' Contact direction
7*a* Lower wiper edge
7*b* Radial contact surface
8 Circumference
9 Radial shoulder
10 Axial direction
11 Transversal direction, radial direction
12 Circumferential groove
12*a, b* Face, side flank
13 Passthrough opening
14 Pass through Opening
15 Offset
16 Spring
17 Ring, annular disc
18, 18.1, 18.2 Wiper support, wiper rod
18' Support direction
19 Notch
19*a, b* Flank
20.1, 20.2 Rotation direction
21 Bore hole
22 Bearing receiver
22*a, b* receiving element
23 Bolt connection
24 Spacer
25 Gap
26 Sprocket
27 Groove
40, 40.1, 40.2 Processing shaft, shaft
40' Rotation axis
40*a* Wiping section
40*b* Processing section
50 Contamination
100 Processing device
100*a* Feed opening
100*b* Drain opening
101 Housing
200 Object

The invention claimed is:

1. A bearing arrangement (1) of a compacting, perforating or cutting device for objects (200) to be processed, the bearing arrangement comprising:
   at least one processing shaft (40) that rotates about a rotation axis;
   an axially fixed or an axially floating shaft bearing (2),
   a bearing plate (3) on whose outside (3*a*) the shaft bearing (2) is attached directly or at a distance therefrom, and
   a splashguard wall (4) inside (3*b*) of the bearing plate (3) and at a distance (5) from the bearing plate (3),
   wherein the bearing plate (3) and the splashguard wall (4) respectively include a passthrough opening (13, 14) for said processing shaft (40),
   wherein a wiping device (6) with a flat plate-shaped wiper (7) is arranged in between the bearing plate (3) and the splashguard wall (4) configured to wipe contaminants from a wiping section (40*a*) of the processing shaft (40) extending through the distance or from a shaft portion annular disc (17) that is non-rotatably attached on the shaft, and
   wherein a wiper edge (7*a*) is configured as a front end of a wiper protrusion that is formed at an acute angle, and the flat plate-shaped wiper (7) contacts with the wiper edge (7*a*) in the wiping section (40*a*).

2. The bearing arrangement according to claim 1, wherein
   the wiper (7) is fixed in place transverse (11) to the shaft (40) and contacts with the wiper edge (7*a*) at the wiping section (40*a*) directly.

3. The bearing arrangement according to claim 1, wherein
   the wiper (7) is movably attached in an axial direction (10) of the processing shaft directly or indirectly at the bearing plate (3), or the splash guard wall (4), or at a wiper support (18) attached at the bearing plate (3).

4. The bearing arrangement according to claim 2, wherein
   the wiper edge (7*a*) contacts the wiping section (40*a*) below a center of a circumference (8) of a circumferential groove.

5. The bearing arrangement according to claim 1, wherein
   the flat plate-shaped wiper (7) rotates about a rotation axis (7') that is parallel to and offset from the rotation axis (40') of the shaft (40), wherein the rotating flat plate-shaped wiper contacts a radial shoulder (9) of the wiping section (40*a*) or the shaft portion annular disc (17), and
   the rotating flat plate-shaped wiper (7) and the wiping section (40*a*) or the shaft portion annular disc (17) rotate counter acting.

6. The bearing arrangement according to claim 1, wherein
   the flat plate-shaped wiper (7) comprises a radial contact surface (7*b*).

7. The bearing arrangement according to claim 6, wherein
the flat plate-shaped wiper is attached as a non-rotatable component and sealed tight in an axial direction (10) on the shaft (40) or integrally configured therewith in one piece.

8. The bearing arrangement according to claim 6, wherein
plural notches (19) are arranged in the flat plate-shaped wiper in its largest outer diameter distributed over the circumference of the wiper.

9. The bearing arrangement according to claim 1, in which the at least one processing shaft (40) comprises two parallel counter rotating processing shafts (40.1, 40.2)
wherein
the flat plate-shaped wiper (7) rotates about the rotation axis (40') of a first shaft (e.g. 40.1) of the two parallel counter rotating processing shafts and is non-rotatably connected to the first shaft, and
a radial shoulder (9) is configured at the wiping section (40a) of a second shaft (e.g. 40.2) of the two parallel counter rotating processing shafts.

10. The bearing arrangement according to claim 9, wherein
the radial shoulder (9) that contacts said flat plate-shaped wiper is configured at another wiper and the radial shoulder (9) is a contact surface (7b) of said another wiper.

11. The bearing arrangement according to claim 9, wherein the radial shoulder (9) that contacts said flat plate-shaped wiper is configured by a side flank (12b) of a circumferential groove (12).

12. The bearing arrangement according to claim 2, wherein a circumference (8) of the wiping section (40a) is a base (12a) of a circumferential groove (12), wherein said circumferential groove
is arranged either in an outer circumference of the wiping section (40a) of the processing shaft (40) or in an outer circumference of the shaft portion annular disc (17) that is slid over the wiping section (40a) and non-rotatably fixed and axially tight in the distance (5), or
is formed by an axial offset (15) between two rings (17).

13. The bearing arrangement according to claim 9, wherein
a ring (17) with a circumferential groove (12) is non-rotatably connected to the first shaft (40.1), and
at least one rotating wiper (7) is non-rotatably connected to the second shaft (40.2).

14. The bearing arrangement according to claim 9, wherein
the splash guard wall (4) is formed by an upper wall element and a lower wall element (4a and 4b) that are connected with one another in a disengageable manner wherein the wall elements adjoin in the vertical direction and circumferentially envelop the two processing shafts (40.1, 40.2), wherein the upper wall element (4a) includes a downward open pass through opening (14.1a) in its lower portion for each processing shaft or
the lower wall element (4b) includes an upward open pass through (14.1b) for each processing shaft.

15. The bearing arrangement according to claim 14, wherein
at least one of the downward open pass through openings (14.1a) of the upper wall element (4a) and/or at least one of the upward open pass through openings (14.1b) of the lower wall element (4b) engages a circumferentially extending groove in the first and second shafts (40.1, 40.2), or at least one of the downward open pass through openings (14.2) of the lower wall element (4b) engages a circumferentially extending groove (27) in a wiper rod (18.1, 18.2).

16. The bearing arrangement according to claim 1, wherein
the wiper (7) is fixed in place transverse to the shaft (40) and contacts with the wiper edge (7a) at the shaft portion annular disc 07) that is non-rotatably attached on the shaft so that the wiper (7) contacts directly or indirectly radially at a circumference (8) of a circumferential groove of the shaft portion annular disc (17) or the wiper (7) is fixed in place axially at a radial shoulder (9) of the wiping section (40a).

17. A compacting, perforating, or cutting device comprising:
at least one processing shaft (40) that is rotatably supported by at least one bearing arrangement (1), wherein the bearing arrangement comprises an axially fixed or an axially floating shaft bearing (2), a bearing plate (3) on whose outside (3a) the shaft bearing (2) is attached directly or at a distance therefrom, and a splashguard wall (4) inside (3b) of the bearing plate (3) and at a distance (5) from the bearing plate (3),
wherein the bearing plate (3) and the splashguard wall (4) respectively include a passthrough opening (13, 14) for said processing shaft (40),
wherein a wiping device (6) with a flat plate-shaped wiper (7) is arranged in between the bearing plate (3) and the splashguard wall (4) configured to wipe contaminants from a wiping section (40a) of the processing shaft (40) extending through the distance or from a shaft portion annular disc (17) that is non-rotatably attached on the shaft, and
wherein a wiper edge (7a) is configured as a front end of a wiper protrusion that is formed at an acute angle, and the flat plate-shaped wiper (7) contacts with the wiper edge (7a) in the wiping section (40a).

18. The device according to claim 17,
wherein at least one non-co rotating wiper (7) is configured identical to additional wipers (7) that are arranged in a processing section (40b) of the at least one processing shaft (40.1).

* * * * *